(12) United States Patent  
Kim

(10) Patent No.: US 6,760,797 B1  
(45) Date of Patent: Jul. 6, 2004

(54) METHOD FOR ALLOCATING CHANNEL IN DEVICE HAVING DIGITAL INTERFACE

(75) Inventor: Do-hyoung Kim, Kyungki-do (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 386 days.

(21) Appl. No.: 09/626,244

(22) Filed: Jul. 26, 2000

(30) Foreign Application Priority Data

Jul. 26, 1999 (KR) .......................................... 1999-30337

(51) Int. Cl.[7] .............................................. G06F 13/00
(52) U.S. Cl. ...................... 710/107; 710/105; 710/106; 710/240; 710/241; 370/252; 370/400
(58) Field of Search ................................. 710/100, 105, 710/106, 107, 240, 241, 35; 370/252, 391, 396, 400, 432; 348/552; 379/399.01

(56) References Cited

U.S. PATENT DOCUMENTS

| | | | |
|---|---|---|---|
| 4,998,245 A | * 3/1991 | Tanaka et al. | 370/432 |
| 5,506,846 A | * 4/1996 | Edem et al. | 370/396 |
| 5,535,208 A | * 7/1996 | Kawakami et al. | 370/391 |
| 5,550,802 A | * 8/1996 | Worsley et al. | 370/252 |
| 5,603,058 A | * 2/1997 | Belknap et al. | 710/35 |
| 5,991,520 A | * 11/1999 | Smyers et al. | 710/100 |
| 6,097,441 A | * 8/2000 | Allport | 348/552 |
| 6,134,625 A | * 10/2000 | Abramson | 710/241 |
| 6,185,632 B1 | * 2/2001 | Berkema | 710/20 |
| 6,456,714 B2 | * 9/2002 | Shima et al. | 379/399.01 |
| 6,496,509 B1 | * 12/2002 | Fant | 370/400 |

* cited by examiner

Primary Examiner—Xuan M. Thai  
Assistant Examiner—Justin King  
(74) Attorney, Agent, or Firm—Sughrue Mion, PLLC

(57) ABSTRACT

A method for allocating a channel in a digital device having a digital interface such as the IEEE1394. The method for allocating a channel to a specific output plug of a digital device having a digital interface, in which a predetermined relationship with a predetermined part of another digital device is set in accordance with a specification related to a digital interface, includes the steps of calculating a channel number to be allocated to the output plug in accordance with a condition of the digital interface specification, and determining whether the calculated channel number can be allocated to the output plug. If it is determined that the calculated channel number can be allocated, then the calculated channel number is allocated to the output plug. If it is determined that the calculated channel number can not be allocated to the output plug, an arbitrary channel number is determined, the value of the predetermined part is set based on the arbitrary channel number in order to satisfy the conditions of the digital interface specification, and the arbitrary channel number is allocated.

4 Claims, 2 Drawing Sheets

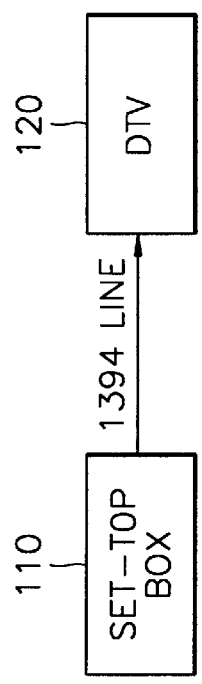

METHOD FOR ALLOCATING CHANNEL IN DEVICE HAVING DIGITAL INTERFACE

BACKGROUND OF THE INVENTION

1. Field of the Invention

The present invention relates to a method for connection management through a digital interface among digital devices, and more particularly, to a for allocating a channel in devices having a digital interface such as IEEE1394.

2. Description of the Related Art

With the development of digital devices such as a digital television (TV), a digital video cassette recorder (VCR), and a digital set-top box, standards for interfacing the digital devices have been developed. One standard for interfacing the digital devices is the IEEE1394 standard which is disclosed in "IEEE1394–1995: Standard for a High Performance Serial Bus, (IEEE Standard Press, December 1995)".

In addition, in systems connected to each other via a digital interface such as IEEE1394, connection of isochronous bit streams among digital devices is managed by the IEC61883 specification. The IEC61883 specification is disclosed in "Specification of Digital Interface for Electronic Audio/Video Equipment, (Part 1, December 1995, HD Digital VCR Conference".

The IEC61883 specification defines an input plug and an output plug as means for inputting and an outputting of a bit stream in a digital device. The input plug and the output plug are controlled by an input master plug register (iMPR), an input plug control register (iPCR), an output master plug register (oMPR), and an output plug control register (oPCR), respectively. Each digital device manages connection by controlling the registers related to the input plug and the output plug.

Types of connections between digital devices include a point-to-point connection and a broadcast connection. In the point-to-point connection which is formed by an output plug, an input plug, and a channel between these plugs, any digital device can establish or overlay a connection. The device which established the connection can subsequently terminate the connection, thereby freeing the resources (e.g., channels and bandwidth) used by the connection. The broadcast connection is divided into a broadcast-in connection and a broadcast-out connection. The broadcast-in connection connects an input plug and channels, and the broadcast-out connection connects an output plug and channels. The broadcast connection can be established by those devices which actually input and output bit streams through the broadcast connection. A device in the network may terminate and free the connection. At this time, connection management including establishing or freeing the point-to-point connection and the broadcast connection is performed using iMPR, oMPR, iPCR, and oPCR registers. A device that wants to be allocated resources or wants to free resources communicates with a device for isochronous resource management (IRM) of the entire network system in order to be allocated resources or to free resources. For example, in order to communicate image data through a broadcast-out connection between a set-top box (STB) and a digital TV (DTV), the STB can establish a broadcast-out connection to a certain channel (for example, channel 63) and the DTV can establish a broadcast-in connection to a certain channel. By doing so, STB and DTV communicate image data through a certain channel as a communications medium.

Presently, a regulations exists regarding the subject of connection establishment, a channel number to be allocated at the time of establishment, a bandwidth to be allocated at the time of establishment, the subject of the freeing operation, and so on. The channel number allocated when a broadcast-out connection is established has a predetermined relationship with a broadcast channel base field of the oMPR. In addition, where a device has a plurality of output plugs, different channel numbers are allocated to output plugs according to the values of the broadcast channel base field of the oMPR. That is, when the value of the broadcast channel base field is 63 (i.e., the bit value is "111111"), the same channel number is allocated to output plugs and otherwise, consecutive numbers are allocated to the output plugs.

However, a channel number, which is determined to be allocated according to the regulation, cannot be allocated in some cases. For example, assuming that a device has three output plugs and the value of the broadcast channel base field of the oMPR is 33, a broadcast-out connection needs to be established for output plug 1 when channel number 33 is already allocated to output plug 0. However, since channel number 34 is used by another device, it cannot be allocated to output plug 1. Therefore, there is a problem in that no regulation is prepared for a case where consecutive channel numbers cannot be allocated.

SUMMARY OF THE INVENTION

To solve the above problems, it is an objective of the present invention to provide a method for allocating a channel in a device having digital interface such as the IEEE1394, wherein a channel number may be allocated in accordance with predetermined constraints even if the channel number to be allocated is limited by another part and the thus-determined channel number cannot be allocated due to a particular reason.

It is another object of the present invention to provide a method for allocating a channel in a device having a digital interface such as the IEEE1394, in which a channel number for a broadcast-out connection can be allocated in accordance with IEC61883, even if a channel number to be allocated in accordance with IEC61883 specification for a broadcast-out connection cannot be allocated due to a particular reason.

To accomplish the above object of the present invention, there is provided a method, which satisfies a condition, for allocating a channel to a specific output plug, in which a predetermined relationship with the state of a predetermined part of another digital device is set in accordance with a specification related to a digital interface, in a digital device having a digital interface, the method having the steps of (a) calculating a channel number to be allocated to the output plug in accordance with the condition of the digital interface specification; (b) trying to allocate the channel number calculated in the step (a) to the output plug; and (c) in the step (b), allocating the channel number to the output plug if the trial is successfully done, and if the trial fails, receiving an arbitrary channel number; based on the arbitrary channel number, setting the value of the predetermined part in order to satisfy the conditions of the digital interface specification; and allocating the arbitrary channel number.

To accomplish another object of the present invention, there is also provided a method, which satisfies a condition, for allocating a channel to a specific output plug, in which a predetermined relationship with the state of a predetermined field of a specific register of another digital device is set in accordance with a specification related to a digital interface, at the time of establishing a broadcast-out connection in a digital device having a digital interface, having the steps of (a) calculating a channel number to be allocated to the output plug according to the condition complying with the digital interface specification; (b) trying to allocate the channel number calculated in the step (a) to the output plug; and (c) in the step (b), establishing a broadcast-out channel with the channel number if the trial is successfully done, and if the trial fails, receiving an arbitrary channel number; based on the arbitrary channel number, setting the state value of a predetermined field in the predetermined register in order to satisfy the conditions of the digital interface specification; and establishing a broadcast-out connection with the arbitrary channel number.

BRIEF DESCRIPTION OF THE DRAWINGS

The above objectives and advantages of the present invention will become more apparent by describing in detail a preferred embodiment thereof with reference to the attached drawings in which:

FIG. 1 is a block diagram illustrating a network system in which a plurality of digital devices are connected to each other via a digital interface such as the IEEE1394;

FIG. 2 is a detailed diagram illustrating an oPCR included in each of the digital devices in FIG. 1;

FIG. 3 is a detailed diagram illustrating an oMPR included in each of the digital devices in FIG. 1.

DETAILED DESCRIPTION OF THE INVENTION

Figure 4:
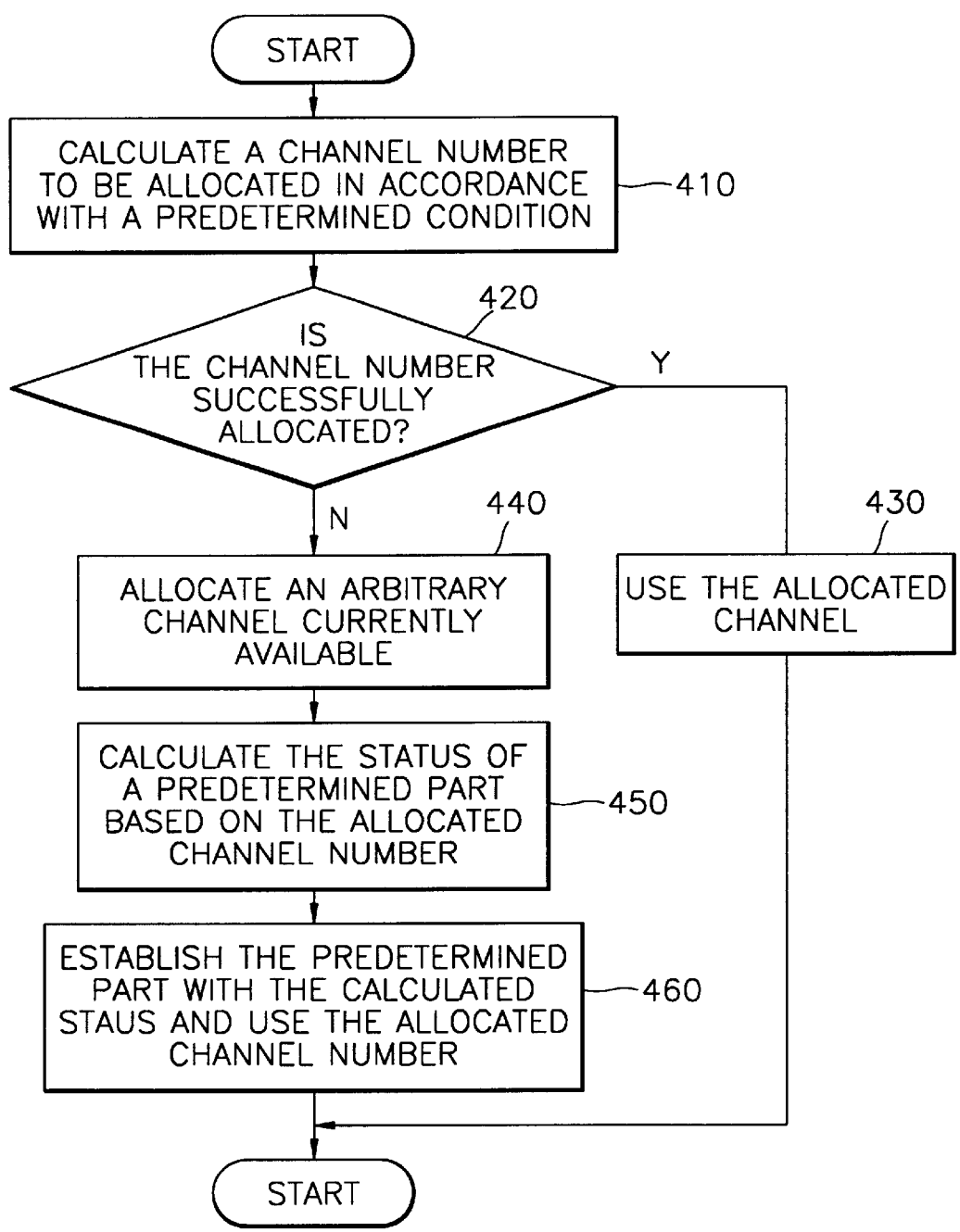
FIG. 4 is flow chart illustrating a method for allocating a channel in a device having digital interface according to the present invention.

Hereinafter, embodiments of the present invention will be described in detail with reference to the attached drawings. The embodiments of the present invention are provided in order to more completely explain the present invention to one of ordinary skill in the art.

FIG. 1 is a block diagram illustrating a network system where a plurality of digital devices are connected to each other via a digital interface such as the IEEE1394.

Referring to the system shown in FIG. 1, a set-top box (STB) 110, which is a source device, and a digital television (DTV) 120, which is a sink device, are connected via an IEEE1394 line. In order for two or more digital devices to communicate data to each other as shown in FIG. 1, a broadcast connection is established which is an isochronous connection for data transmission between devices. If the STB 110 establishes a broadcast-out connection using a specific channel (for example, channel 63) and the DTV 120 establishes a broadcast-in connection using the channel, image data is transmitted via the specific channel, which functions as a communications medium between the STB 110 and the DTV 120. In this case, the broadcast-out connection specifies the channel number to be allocated at the time of the connection establishment.

FIG. 2 is a detailed diagram of oPCR included inside the digital devices of FIG. 1. The oPCR includes data regions of on-line, broadcast counter, point2point, counter, reserved, channel number, data rate, overhead ID, and payload.

FIG. 3 is a detailed diagram of oMPR included inside the digital devices of FIG. 1. The oMPR includes data regions of data rate capability, broadcast channel base, extension field 1, extension field 2, reserved, and number of output plugs.

FIG. 4 is a flowchart illustrating a method for allocating a channel in a device having digital interface according to the present invention, and the method will be described with reference to FIGS. 2 and 3.

Initially, when a channel is to be allocated in a digital device having a digital interface such as the IEEE1394, a channel number has to satisfy a predetermined relationship with a predetermined part of other digital devices affecting the digital device according to specification relating to the digital interface. Therefore, once channel allocation starts, a system, in which a plurality digital devices are connected with each other as shown in FIG. 1, calculates a channel number(s) to be allocated according to the IEC61883 specification in step 410.

An example in which a certain digital device complying with the IEC61883 specification has n output plugs follows. When the device establishes a broadcast-out connection for an i-th output plug of the n output plugs, a channel number of the oPCR to be used is determined in association with a broadcast channel base of the oMPR by the following procedure:

if (broadcast channel base !=63)
  channel number [i]=(broadcast channel base +i)%63; ($0 \leq i < n$)
 else
  channel number [i]=63; ($0 \leq i < n$).

Here, the broadcast channel base is a 6-bit field of the oMPR register of a device, "!" is NOT operator, and "a%b" is a modulus operation to obtain a residual when a is divided by b. That is, a broadcast-out channel number has a predetermined relationship with the broadcast channel base field of an oMPR in FIG. 3. Assuming that the device has a plurality of output plugs, when the value in the broadcast channel base field of the oMPR is 63 (i.e., the bit value is "111111"), an identical channel number is allocated, and when the value is not 63, channel numbers allocated in the output plugs have consecutive channel numbers.

Such a condition in the channel number allocation applies only to the case in which the broadcast-out connection with respect to the output plugs is an established connection. The condition does not apply to the case in which the broadcast-out connection with respect to the output plugs is an overlay connection. In other words, if an attempt is made to connect broadcast-out output to an output plug for which a point-to-point connection has already been established, the above regulation does not apply and the channel number used for the point-to-point connection is used without any change. In this case, the allocated channel numbers are freed by a device for terminating connections to the output plugs when all the connections to the output plugs are terminated.

Next, it is determined whether the establishment is successfully performed with respect to the calculated channel number in step 420. If the calculated channel number can be allocated, the calculated channel number is allocated and the broadcast-out connection is established in step 430. However, if the calculated channel number can not be allocated due to a particular reason (e.g., the channel is used for another device), a channel currently available for the allocation is allocated in step 440. In step 450, based on the allocated channel, the value of the broadcast channel base of the oMPR is calculated to meet the condition according to the interface specification as follows:

if (channel number $\geq$ =i)
  broadcast channel base=channel number –i;
 else
  broadcast channel base=channel number –i +63.

Here, i is the output plug number.

Finally, in step 460, the broadcast channel base field of the oMPR is established with the calculated value, and the broadcast-out connection is established with the channel number.

The above-described embodiments of the present invention may be accomplished by a program operable in a computer, and may also be realized in a universal computer executing the program from media used in a computer. The media include storage media such as magnetic storage media (e.g., ROMs, floppy disks, hard disks, etc.), optical reading media (e.g., CD-ROMs, DVDs, etc.), and carrier waves (e.g., transmission via the Internet).

Therefore, according to the present invention, a channel number may be allocated in accordance with a condition relating to the channel number allocation in a device having a digital interface such as the IEEE1394, even if the channel number to be allocated is subject to limitation by another part and it cannot be allocated due to a certain reason.

Further, in a device having a digital interface such as the IEEE1394, the broadcast-out connection may be established by allocating a channel number for the broadcast-out connection in accordance with the specifications of the IEC61883 specification, even if the channel number to be allocated according to the IEC61883 specification at the time of establishing the broadcast-out connection cannot be allocated due to a particular reason.

What is claimed is:

1. A method for allocating a channel to a selected output plug of a plurality of output plugs in a digital interface of a first digital device, wherein a predetermined relationship with a state value of a predetermined part of a second digital device is set in accordance with a specification of the digital interface which includes the output plugs, the method comprising the steps of:

(a) calculating a channel number to be allocated to the selected output plug in accordance with predetermined conditions of the digital interface specification;

(b) determining whether the channel number calculated in the step (a) can be allocated to the selected output plug; and (c) performing allocation of the channel number to the selected output plug if it is determined in the step (b) that the channel number can be allocated to the selected output plug according to the digital interface specification, and if it is determined in the step (b) that the channel number can not be allocated to the selected output plug according to the digital interface specification, determining an arbitrary channel number which is currently available for allocation, setting the state value of the predetermined part of the second digital device based on the arbitrary channel number in order to satisfy the conditions of the digital interface specification, and allocating the arbitrary channel number to the selected output plug according to the satisfied conditions of the digital interface specification.

2. The method for allocating a channel of claim 1, wherein the predetermined part is a broadcast channel base field of an output master plug register complying with the IEC61883 specification.

3. The method for allocating a channel of claim 2, wherein a broadcast channel base of an output master plug is set to (channel number-output plug number) if the channel number is greater than the output plug number, and the broadcast channel base of an output master plug is set to {(channel number-output plug number)+63} if the channel number is less than the output plug number.

4. A method for allocating a channel to a selected output plug of a plurality of output plugs in a digital interface of a first digital device at the time of establishing a broadcast-out connection between the first digital device and a second digital device, wherein a predetermined relationship with a state value of a predetermined field of a register of the second digital device is set in accordance with a specification of the digital interface, comprising the steps of:

(a) calculating a channel number to be allocated to the selected output plug according to conditions of the digital interface specification;

(b) determining whether the channel number calculated in the step (a) can be allocated to the selected output plug; and (c) establishing a broadcast-out channel with the channel number if it is determined that the channel number can be allocated to the selected output plug in the step (b) according to the digital interface specification, and if it is determined in the step (b) that the channel number can not be allocated to the selected output plug according to the digital interface specification, determining an arbitrary channel number which is currently available for allocation to the selected output plug, setting the state value of the predetermined field in the register based on the arbitrary channel number in order to satisfy the conditions of the digital interface specification, and establishing the broadcast-out connection with the arbitrary channel number allocated to the selected output plug according to the satisfied conditions of the digital interface specification.

* * * * *